Sept. 5, 1967  S. B. YOHO  3,339,977
BALE PILING TRAILER FOR HAY BALERS
Filed Oct. 22, 1965  3 Sheets-Sheet 1
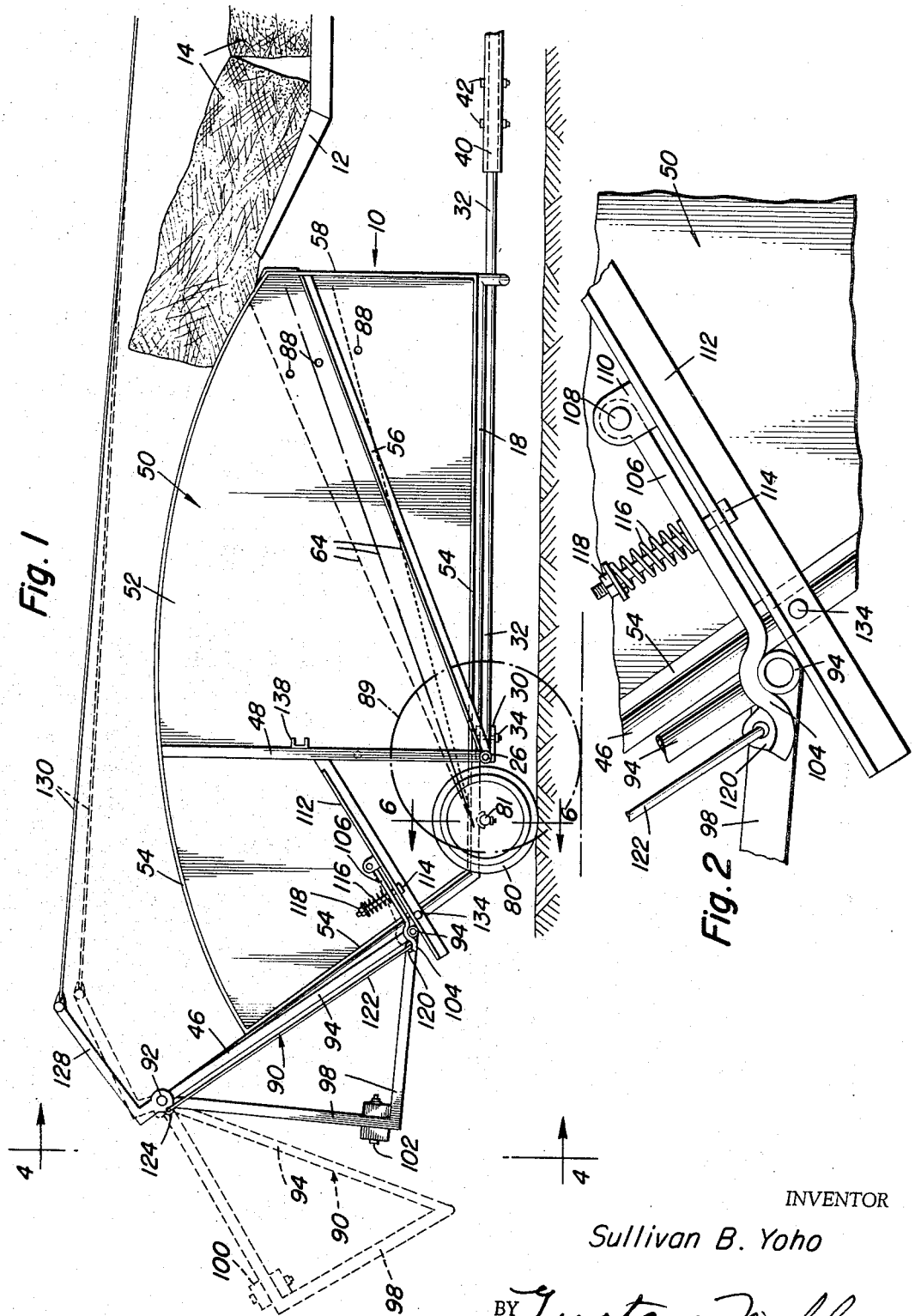
INVENTOR
Sullivan B. Yoho
BY Gustave Miller
ATTORNEY Sept. 5, 1967 — S. B. YOHO — 3,339,977
BALE PILING TRAILER FOR HAY BALERS
Filed Oct. 22, 1965 — 3 Sheets-Sheet 2

INVENTOR
Sullivan B. Yoho
BY Gustave Miller
ATTORNEY

Sept. 5, 1967  S. B. YOHO  3,339,977
BALE PILING TRAILER FOR HAY BALERS
Filed Oct. 22, 1965  3 Sheets-Sheet 3
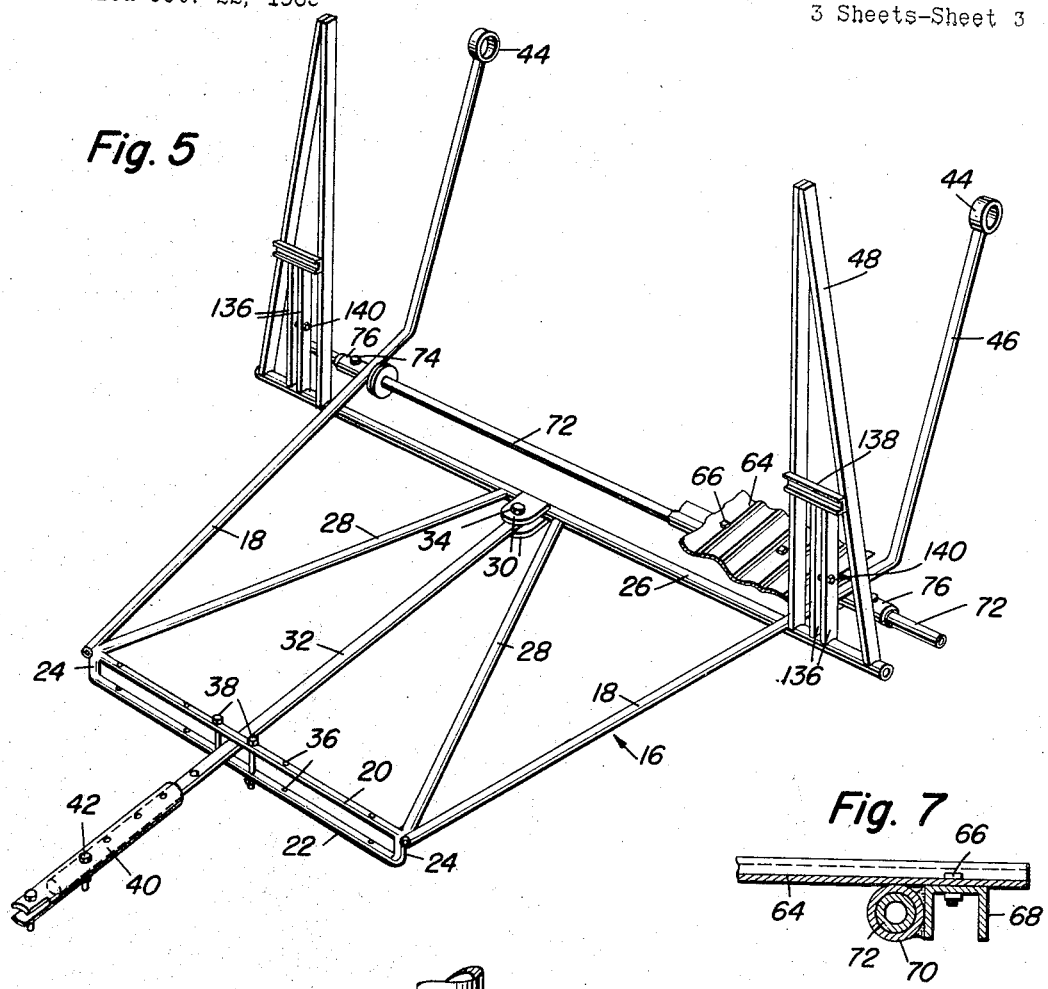
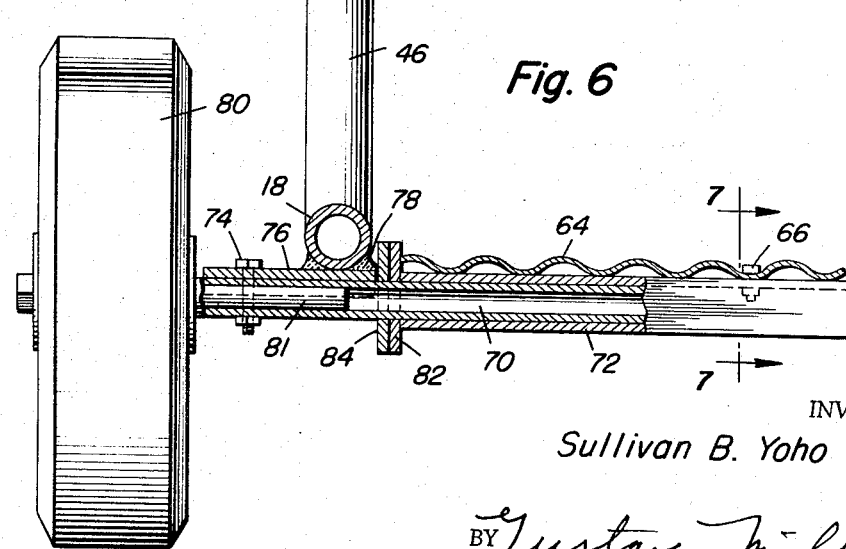
INVENTOR
Sullivan B. Yoho
BY Gustave Miller
ATTORNEY United States Patent Office 3,339,977
Patented Sept. 5, 1967

3,339,977
BALE PILING TRAILER FOR HAY BALERS
Sullivan B. Yoho, Rte. 3, Box 66,
Proctor, W. Va. 26055
Filed Oct. 22, 1965, Ser. No. 501,580
11 Claims. (Cl. 298—24)

ABSTRACT OF THE DISCLOSURE

This invention is a hay bale piling trailer for attachment to a hay baler, and has an inclined floor secured at the rear end of the trailer and adjustably secured at its forward end, for receiving the bales from the baler. The inclined floor and the sides diverge toward the rear end, thus assuring that there is no jamming of the bales as they slide down to a rear gate, which is pivoted at its top to rearwardly extending chassis arms of the trailer chassis, and the gate extends and is held forwardly at its bottom end, to a releasable latch by a counterweight. The gate is released automatically by a predetermined weight of bales against the gate. The gate may also be released manually by the tractor operator. A trailer tow tongue is secured to the trailer at the trailer rear end, and the tow tongue supports the front end, at an adjustable angle, to track directly behind or adjustably to either side or directly behind the trailer as desired.

Objects of invention

This invention relates to a bale piling trailer for hay balers, and has for an object to provide an improved trailer for towing attachment to a hay baler, normally towed by a farm tractor, for collecting the bales from the hay baler, and then dropping or piling them, preferably automatically, in a group of several bales, thus reducing the numbers of stops necessary by the vehicle picking up the bales for transportation from the hay field.

At present, as the hay baler moves over the field, the material to be baled is cut and automatically formed into bales, each bale being discharged onto the field as it is formed whereby considerable labor is involved in collecting these scattered bales and hauling them from the field.

Therefore, it is the primary object of the invention to provide a bale carrier for balers of the above described character that is adapted to be connected to the baler for collecting the bales as they are dispensed from the baler and for discharging the bales in piles so that they are conveniently arranged for hauling off the field.

A further object of the invention is to provide a carrier of the above described character and having a novel means for maintaining the tail gate in closed position and opening the same to permit the discharge of bales from the trailer or carrier.

A further object of this invention is to provide a bale carrier trailer wherein the floor of the bale carrier provided therein slopes or inclines rearwardly against a preferably forwardly inclined tail gate releasably latched at its bottom to automatically open when the pressure of the accumulating bales equals or exceeds the predetermined adjustable latch pressure. In addition, a manually operable latch releasing means under the control of the operator of the towing vehicle is provided for releasing the gate manually whenever desirable.

A further object of this invention is to provide a bale carrier trailer for a hay baler wherein the angle of the tow tongue from the trailer to the hay baler towing vehicle may be adjusted as desired so that the trailer may trail or track either directly behind or at a desired angle, offset from directly behind the towing vehicle, which is particularly desirable when the hay field is hilly.

A further object of this invention is to provide an inclined floor for a bale piling trailer which floor is made of a corrugated, non-ferrous material, such as aluminum, high strength plastic or the like, which will permit the hay bales to readily slide down thereon at the discharge point, the floor being secured through the valleys of the corrugations to eliminate any obstruction to the movement of the bales.

Brief description

In brief, this invention is a bale carrier trailer for a hay baler which will travel close to the ground in operation in the hay field, and which may yet be readily towed over roads at higher speed, and over rough roads, such as usually present in hay field areas, either by substituting larger diameter wheels for the regular operating wheels or, alternatively, wherein larger wheels, already mounted on stub axles, may have the stub axles readily attached to the chassis of the trailer, which may again be readily removed for using the trailer in the hay field.

The bale piling trailer of this invention also includes a skeleton chassis mounted adjacent its rear end on wheels on an axle secured to the skeleton framework, a sleeve on this same axle providing a support for the rear end of an adjustably inclined non-ferrous material corrugated floor, such as aluminum, high strength plastic or the like, affixedly secured side walls of the trailer diverging outwardly, the floor being shaped to substantially fill the outwardly diverging area between the diverging side walls and leading to a top pivoted forwardly inclined tail gate releasably latched under adjustable releasing pressure to automatically discharge the accumulated bales when the predetermined pressure of accumulated bales has been reached. A manual release for the latch is also provided, and a counterbalance on the bottom of the tail gate serves to return the gate to forwardly inclined position after the bales have been released. A preferably telescopic tow tongue is also pivotally secured to the chassis adjacent the rear and extends between a pair of vertically spaced front bars of the chassis with securing means for maintaining the tow tongue at a desired angle so that the trailer may track directly behind the towing hay baler, or may be adjusted to brace toward either side of the towing hay baler as when on the side of a hill.

Description of drawings

With the above and related objects in view, this invention consists in the details of construction and combination of parts, as will be more fully understood from the following description, when read in conjunction with the accompanying drawing, in which:

FIG. 1 is a side elevational view of the hay bale piler showing a bale in the process of being deposited thereon.

FIG. 2 is a fragmentary enlarged detail view showing the spring releasing catch for the rear gate.

FIG. 5 is a perspective view of the framework of the baler per se, partly in fragment, showing how the towing rod may be adjusted at an angle.

FIG. 6 is a fragmentary sectional view on line 6—6 of FIG. 1.

FIG. 7 is a section on line 7—7 of FIG. 6.

Detailed description

Figure 3:
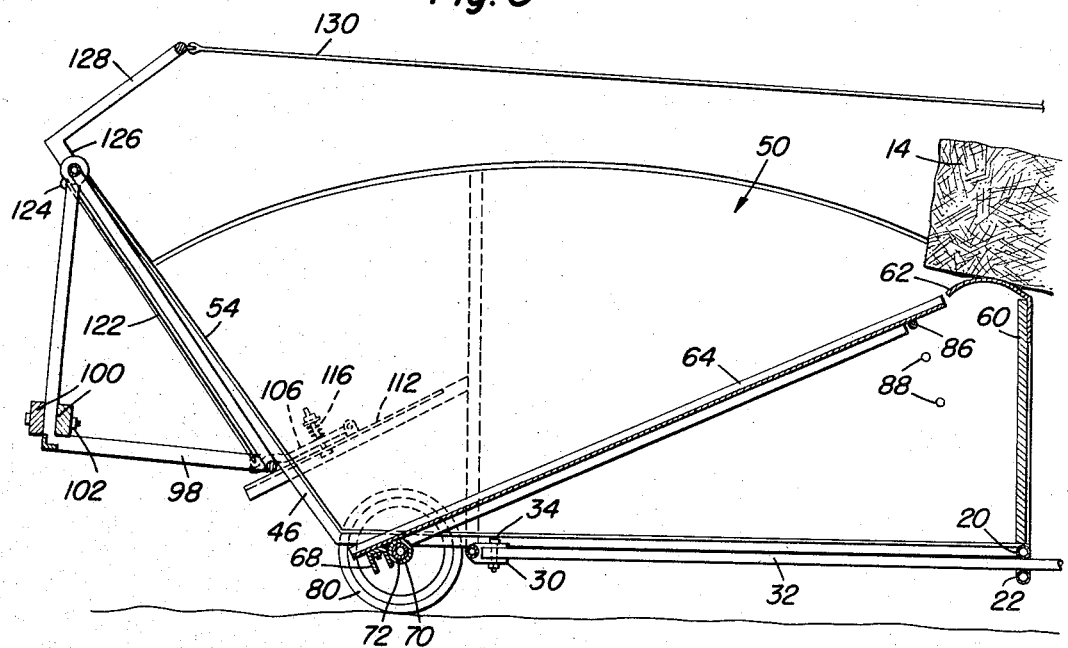
FIG. 3 is a sectional view longitudinally of the baler on line 3—3 of FIG. 4.

There is shown at 10 the bale piler trailer of this invention for use with a conventional hay baler having a delivery chute 12 from which hay bales 14 are delivered onto the trailer 10. The trailer includes a skeletal chassis 16 shown generally in FIG. 5. This chassis 16 consists of a pair of rearwardly diverging side frame bars 18 secured at their front ends to a pair of vertically spaced apart parallel transverse bars 20 and 22 secured in a rectangle by short upright bar sections 24. The bars 20 and 22 are also secured to a rear transverse bar 26, parallel to the bars 20 and 22, and angular brace bars 28 extend from the connection between the front ends of side bars 18 and the front transverse bar 20, the angle brace bars joining with the rear transverse bar 26 in spaced apart relation adjacent its center, a pair of vertically spaced apart ears 30 being secured to the center of the rear bar 26 between the angle bars 28. A trailer tow tongue 32 extends between the front bars 20 and 22 and is pivotally secured between the ears 30 by a tow pin 34.

The front transverse bars 20 and 22 are provided with a plurality of aligned apertures 36 to receive tow tongue angle locking bolts 38, these apertures 28 being so spaced along their bars 20 and 22 that the tow tongue 32 may be adjustably locked at a desired angle, at right angles to bar 26 when it is desired that the trailer 10 track centrally behind the hay baler or towing vehicle, or in intermediate or side positions when it is desired that the trailer track more or less to one side of the towing vehicle, as is desirable when operating on the side of a hill constituting the hay field. The tongue 32 may be a single member, or may be telescopically adjustable, as shown by means of a sleeve 40 adjustably secured thereto by transverse bolts and nuts 42. The tow sleeve 40 is provided with a conventional tow hitch cooperating end (not shown) for securing it to the hitch at the end of the hay baler or other towing vehicle.

The diverging side bars 18 continue beyond their connection to the cross rear transverse bar 26 a distance, and then terminate in tail gate pivot bearings 44 at the top ends of integrally angularly upstanding arms 46. A triangular brace 48 is welded on outwardly extending end portions at each end of the rear transverse bar 28 and serves in part to assist in holding the rearwardly diverging side walls 50 in position. Each side wall 50 consists of a panel 52 of plywood or other suitable material held in a framing of channel iron 54. The channel iron framing 54 is suitably shaped so that it may be suitably secured on the diverging side bars 18 and the upstanding arm portions 46 thereof, such as by spot welding, bolts and nuts, or a combination thereof, the triangular braces 48 holding the side walls 50 against the outward pressure of the accumulated hay bales 14 in use, assisted by an angle iron brace 56 on the outside of each side wall 52 extending from bar 26 to the forward vertical portion 58 of the side wall framing 54 adjacent its top. A low forward wall panel 60 may also be framed by the vertical portion 58, and extending from the top of forward wall panel 60 is a curved lip 62, of metal, over which the bale 14 is discharged onto the trailer floor 64.

The trailer floor 64 is made of suitable corrugated non-ferrous material, such as aluminum, so that it will not rust, but remain smooth for the hay bales to slide readily theredown. The floor is shaped to conform to the diverging area between the side walls 50 and is pivotally supported at its rear end by having bolts 66 extend through valleys in the corrugations into a channel iron 68 welded on a sleeve 70 about a hollow rod 72, secured by a bolt 74 to a saddle 76 welded at 78 to the bottom of the end portion of each side bar 18 just before it turns up to form the upstanding arms 46. Wheels 80, suitable in size for travel on the field, are journaled on the ends of solid stub axle 81, and removably held thereon in any conventional manner, the axle 81 being also secured in place by bolt 74. Washers 82 are welded at the ends of the axle sleeve 70 and bear against loose washers 84 against the inner ends of the saddles 76.

The forward, narrow, end of the floor 64 is adjustably supported at downward rearward incline by a long rod bolt 86 extending through a pair of aligned, selected holes 88 in the opposite side walls 50, the highest position of course being just below the lip. For road travel, a larger wheel 89 is mounted on a stub axle secured to extended ends of bar 26, or alternatively, may be substituted for the field travel wheels 80, so that the trailer 10 may be towed at a suitable speed when not on the hay field.

Pivoted in the bearings 44 of upstanding arms 46 is a tail gate 90 which is adjusted to open automatically when a proper weight of hay bales has accumulated on the inclined floor 64 in the bale carrier provided by this trailer 10, or may be opened by manual control if and when desired.

Figure 4:
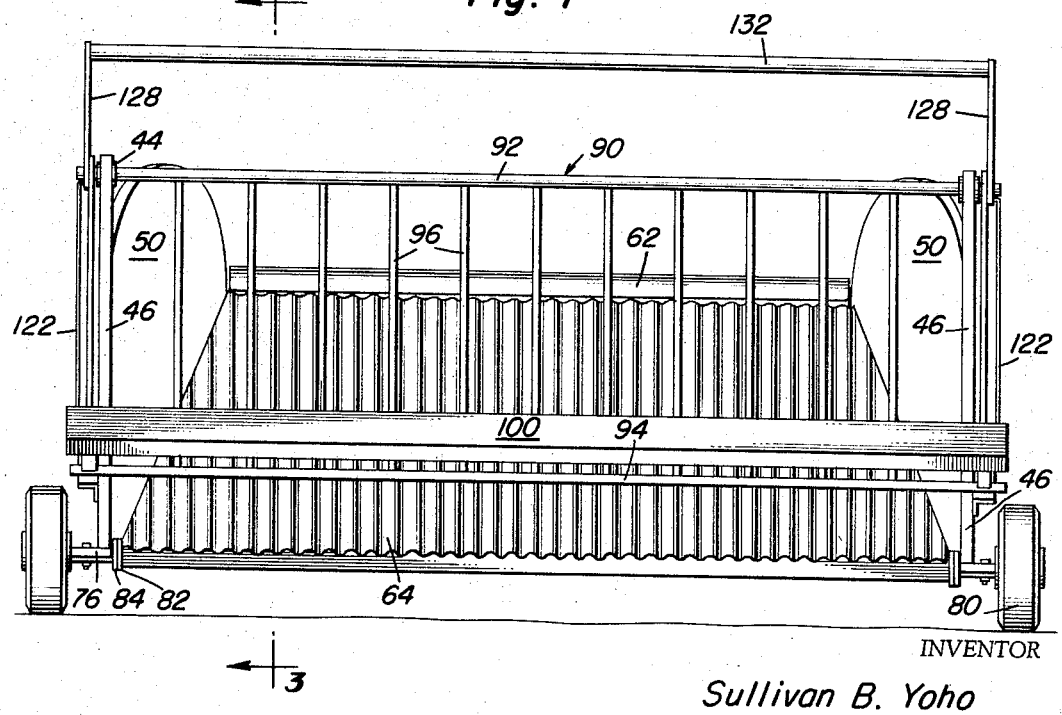
FIG. 4 is an end elevational view of the gate discharge end of the baler, on line 4—4 of FIG. 1.

To accomplish these purposes, the tail gate 90 consists of a top bar 92 which is journaled through the pivot bearings 44, and a bottom bar 94 is secured to the top bar 92 by a plurality of parallel vertical bars 96. The tail gate is thus rectangular, but in closed position, abuts against the upstanding arms 46 and thus is closed at a downwardly forwardly extending incline. To return it to this inclined closed position after being opened, it is provided with a counterbalance consisting of a pair of rearwardly extending angles 98 to which is secured a counterweight means, here shown as being two heavy bars 100 secured by bolts 102. Obviously, a heavy metal rod or bar may be used as the counterweight. It will be noted, particularly, that the position of the counterweight bars 100 is not plumb below the bearings 44, see FIGS. 3 and 4, but are behind plumb position, and thus urge the tail gate to the closed position shown in solid in FIG. 1 from the open position shown in dash outline.

In closed position, the ends of bottom bar 94 extend under a sine wave end 104 of a latch bar 106 pivoted at 108 to an ear 110 mounted on an angle bar 112 and adjustably biased to closing position by a bolt 114 through the angle bar 112, through an aperture in latch bar 106, and through a coil spring 116 whose tension is adjusted by nut 118. In closing, the ends of bottom tail gate bar 94 ride on the top of angle iron 112 to under the sine wave ends 104 of latch bars 106. For manual manipulation of latch arm 106, when desired, an ear 120 on the sine wave end 104 of each latch bar 106 is connected by a connecting rod 122 to one arm 124 of a bell crank 126, journaled on the end tail gate top bar; one crank arm 128 is connected to a cable 130 at one end, the other end of the cable 130 extending forward to a position (not shown) convenient to the operator of the hay baler or towing vehicle. A cross bar 132 causes both latch arms 106 to be actuated simultaneously by the cable 130. The latch arm supporting angle iron 112 is secured adjacent one end by bolt 134 to the rear upstanding arm 44, and the other end is held in slightly adjustable position, as by a vise between two vertical U-iron bars 136 extending between the end of bar 26 and a channel bar 138 mounted on the triangular brace 48, a bolt 140 providing the vise pressure for squeezing the bars 136 to adjustably hold the end of latch bar supporting angle iron 112.

*Operation*

In operation, the operator controlling the hay baler of the towing vehicle attaches the tow tongue 32 thereto in a conventional manner, adjusting the length of the tow tongue sleeve 40 if necessary. Then, as the hay is baled, the bales 14 discharge from the hay baler chute 12 over the trailer lip 60 onto the trailer floor 64, already set at the desired angle by the long bolt 86. If on a level field, the tow tongue is locked in central position by bolts 38, but if on a hillside, the angle of the tongue 32 will be suitably adjusted to cause the trailer to track on the down side of the baler somewhat, so that the bales will more readily slide down the trailer floor 64 against the forwardly inclined tail gate.

Hay bales vary somewhat in weight, and the latch spring 116 is adjusted to yield under the weight of six to eight bales accumulated on the rearwardly, downwardly inclined floor against the inclined tail gate 90. When this weight has accumulated, the spring 116 will yield, and the tail gate 90 will open and let the accumulated bales pile on the ground in a bunch, holding the gate 90 open against the counterbalance 100. When the bales have dropped off, the counterbalance will return the gate to closed position, the bottom bar riding on the angle arm 112 under the sine wave end 104 of the latch arm 106, for the weight of the counterbalance 100 biases the gate to the closed position. Should the gate fail to close, the operator may manipulate the cable 130 to raise the latch arm 106 to permit the gate to close when no hay bale is present. When one or more hay bales are present and the operator does not desire to wait for the automatic operation for any reasons, he may manually raise the latch arm 106 by means of the cable 130, and drop the accumulated bales at any desired position. Using this invention, the operator can manually drop the bales whenever desired, or can automatically drop them in predetermined amounts at spaced intervals along the hay field, thereby reducing the number of stops necessary in picking up the hay bales on a truck for transportation. When through with the field operation, larger wheels may be readily substituted, as above pointed out, for towing the trailer to a different location.

In the drawings, like numbers refer to like parts, and for the purposes of explication, marshalled below are the numbered parts of the improved Bale Piling Trailer For Hay Balers:

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A bale piling trailer for hay balers, said trailer comprising a chassis, a chassis forward end supporting tow tongue secured to said chassis adjacent the rear end of said chassis and extending forwardly therefrom for attachment to a towing baler, a pair of side walls secured on said chassis, said side walls diverging rearwardly from each other, said chassis including a transverse axle member secured thereto adjacent the rear end thereof, trailer rear end supporting wheels on said axle member, a bale receiving and supporting floor conforming in shape to the diverging area between said side walls, said floor being supported at its rear wide end on said chassis, means secured between said side walls adjacent their forward ends and substantially above said chassis supporting the narrow forward end of said floor with said floor at a downward incline toward its rear wide end, spaced apart upstanding arms integrally extending rearwardly and upwardly from said chassis at its rear end, a tail gate pivoted at its top to said upstanding chassis arms and cooperating with said floor and diverging side walls to provide a bale confining carrier, and releasable latch means securing the bottom of said tail gate forwardly of its pivoted top in closed position, said chassis comprising spaced apart parallel front and rear frame members, rearwardly diverging side frame members secured to said front and rear frame members, and angular brace members secured adjacent the angles of said side members to said front member and secured to said rear member in spaced apart relationship adjacent the middle of said rear frame member.

2. The trailer of claim 1, a second front frame member secured to said first frame member parallel thereto in vertical spaced relation therebelow, vertically spaced apart ears mounted on said rear frame member between the angle brace members secured thereto, pivot means securing said towing tongue between said ears, said towing tongue extending between said first and second vertically spaced front frame members, and adjustable means secured through said front frame members at each side of said tongue member securing said tongue at a desired towing angle.

3. The trailer of claim 1, and a triangular brace member on each end of said rear frame member bracing said side walls against outward pressure.

4. A bale piling trailer for hay balers, said trailer comprising a chassis, a chassis forward end supporting tow tongue secured adjacent its rear end to said chassis and extending forwardly therefrom for attachment to a towing baler, a pair of side walls secured on said chassis, said side walls diverging rearwardly from each other, said chassis including a transverse axle member secured thereto adjacent the rear end thereof, trailer rear end supporting wheels on said axle member, a bale receiving and supporting floor conforming in shape to the diverging area between said side walls, said floor being supported at its rear wide end on said chassis, means secured between said side walls adjacent their forward ends and substantially above said chassis supporting the narrow forward end of said floor with said floor at a downward incline toward its rear wide end, spaced apart upstanding arms on said chassis at its rear end, a tail gate pivoted at its top to said upstanding chassis arms and cooperating with said floor and diverging side walls to provide a bale confining carrier, and releasable latch means securing the bottom of said tail gate in closed position, said floor member being corrugated and of non-ferrous material, the axes of the hills and valleys of the corrugations extending lengthwise of said trailer, means pivotally securing the rear end of said corrugated floor on said transverse axle member of said chassis, said floor forward end supporting means being adjustably secured between said side walls for adjusting the incline of said floor.

5. The trailer of claim 4, said floor rear end pivotal securing means comprising a sleeve about said axle member, a channel iron secured to said sleeve, and securing means extending through some of the valleys of said corrugated floor and through said channel iron.

6. The trailer of claim 1, the upstanding ends of said upstanding arms extending rearwardly of their bottom ends, said latch means securing said tail gate at a downwardly, forwardly extending incline, and counterbalance means on said tail gate biasing said tail gate toward closed, latched position.

7. The trailer of claim 6, said tail gate counterbalance means comprising triangular side members at each end of said tail gate, and counterweight means secured between said triangular side members rearwardly of a plumb line from the tail gate pivot supporting point.

8. The trailer of claim 1, said side walls comprising metal framing and reinforcing members and panels secured therein.

9. A bale piling trailer for hay balers, said trailer comprising a chassis, a chassis forward end supporting tow tongue secured adjacent its rear end to said chassis and extending forwardly therefrom for attachment to a towing baler, a pair of side walls secured on said chassis, said side walls diverging rearwardly from each other, said chassis including a transverse axle member secured thereto adjacent the rear end thereof, trailer rear end supporting wheels on said axle member, a bale receiving and supporting floor conforming in shape to the diverging area between said side walls, said floor being supported at its rear wide end on said chassis, means secured between said side walls adjacent their forward ends and substantially above said chassis supporting the narrow forward end of said floor with said floor at a downward incline toward its rear wide end, spaced apart upstanding arms on said chassis at its rear end, a tail gate pivoted at its top to said upstanding chassis arms and cooperating with said floor and diverging side walls to provide a bale confining carrier, and releasable latch means securing the bottom of said tail gate in closed position, said releasable latch means comprising a latch arm pivoted at one end to a supporting base on said trailer, the other end of said latch being shaped in a sine wave to receive a part of the bottom of the tail gate thereunder and over said latch arm supporting base, and adjustable spring means biasing said sine wave end of said latch arm downwardly to latching position, said tail gate automatically opening when pressure of hay bales accumulated on said rearwardly, downwardly inclined floor exceeds the adjusted bias of said latch spring.

10. The trailer of claim 9, and manual operating means available to a trailer tractor operator, connected to the sine wave end of said latch arm for manually opening said latch means whenever desired.

11. The trailer of claim 9, said latch supporting base being pivotally secured adjacent one end to one upstanding chassis arm, and clamping means on said chassis for adjustably holding the other end of said latch supporting base.

References Cited

UNITED STATES PATENTS

| 1,627,336 | 5/1927 | Nelson | 298—1 X |
|---|---|---|---|
| 1,678,114 | 7/1928 | Gustafson | 280—462 |
| 2,316,435 | 4/1943 | James | 56—474 |
| 2,453,384 | 11/1948 | Renken | 298—24 X |
| 2,971,318 | 2/1961 | Solem | 56—473.5 |

FOREIGN PATENTS

| 860,832 | 2/1961 | Great Britain. |
|---|---|---|

LEO FRIAGLIA, *Primary Examiner.*

R. J. JOHNSON, *Assistant Examiner.*